April 8, 1969     H. P. YORGENSEN     3,437,984
PROBE ASSEMBLY
Filed Feb. 8, 1968
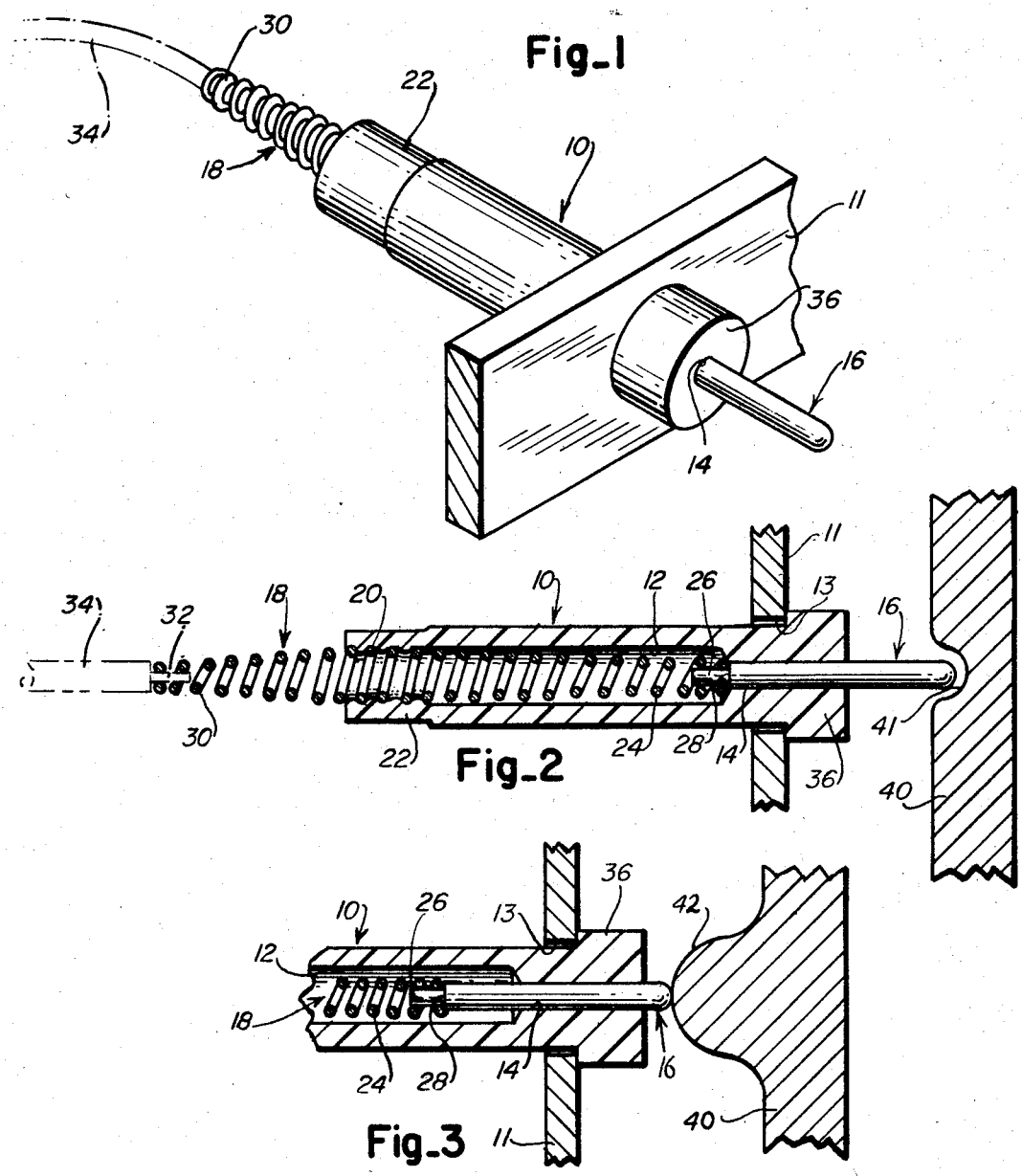
INVENTOR.
HARRY P. YORGENSEN
BY Peter L. Costas
ATTORNEY """# United States Patent Office 3,437,984
Patented Apr. 8, 1969

3,437,984
PROBE ASSEMBLY
Harry P. Yorgensen, Manchester, Conn., assignor to The
J. M. Ney Company, Bloomfield, Conn., a corporation
of Connecticut
Filed Feb. 8, 1968, Ser. No. 703,972
Int. Cl. H01r 9/08, 13/24, 13/50
U.S. Cl. 339—213                                     11 Claims

ABSTRACT OF THE DISCLOSURE

There is disclosed a novel probe assembly provided by a body member having a contact probe and a spring supported therein. The body has a cavity and a channel providing communication between one end of the cavity and the exterior of the body through which the contact probe extends. The contact probe is slidably received in the body member with its inner end portion secured to the spring, which is limited in movement by means on the body member so as normally to bias the probe outwardly of the body member, but being compressible to allow sliding movement inwardly of the channel.

Background of the invention

In electrical and electronic devices, it is frequently necessary to transfer electrical power in simple make-and-break switches, and in other devices having relatively moving elements such as rotary switches. Ideally, such power transfer is made between elements urged into positive contact, and the level of reliability in repeated contacts should be very high. A variety of devices are presently available to perform these functions, the so-called plunger-type contacts or probe assemblies have proven highly effective for some applications.

Notwithstanding the common acceptance and use of this type of device, it is desirable to simplify their design and construction in order to facilitate manufacture, reduce expenditures and enhance their durability and reliability. In the somewhat specialized field of miniature circuitry, simplification of design and construction are particularly significant, since miniaturized assemblies of this type may measure less than one inch in length and less than one-eighth inch in diameter.

Accordingly, it is an object of the present invention to provide a novel probe assembly by which highly effective, positive electrical contact can be made between relatively moving elements and in make-and-break applications.

Another object is to provide such an assembly which is of relatively simple design and construction and which is comprised of a minimum number of component parts whereby manufacture is facilitated, expenditures are minimized and the reliability and durability of the assembly are enhanced.

An additional object is to provide such an assembly which may be relatively durable in construction despite miniaturization, and which may be readily assembled.

Brief description of the drawing

FIGURE 1 is a perspective view of a probe assembly embodying the present invention as mounted in a chassis section, shown fragmentarily;

FIGURE 2 is a view of the probe assembly in longitudinal section to illustrate the internal construction, and with a contact surface shown fragmentarily; and FIGURE 3 is a fragmentary sectional view of the front end of the probe assembly similar to FIGURE 2, with the contact probe forced rearwardly into the body and the spring in compression by the protruding portion on the contact surface.

Summary of the invention

It has now been found that the foregoing and related objects can be readily attained in a probe assembly comprising a body member having an elongated cavity therein and a channel from one end of the cavity to the exterior of that end. An electrically conducting contact probe in the cavity extends outwardly of the one end of the body member through the channel. The channel and cavity of the body member and the probe are cooperatively dimensioned and configured for sliding movement of the probe therein. An electrically conducting elongated compression spring is seated in the cavity and has one end engaged with and in electrical contact with the contact probe. The body member has means spaced from the one end of the spring limiting movement of the spring relative to the one end of the body member, and providing a fixed surface against which the spring may act to bias the probe outwardly of the channel. This allows the spring to expand to urge the contact probe outwardly of the body for contact with another surface, and the spring can be compressed to allow sliding movement of the contact probe inwardly of the housing.

In a preferred embodiment, the spring has an enlarged central portion by which it is fastened to the body and end portions having somewhat smaller diameters relative thereto. One of the end portions is dimensioned to encircle the contact probe and the other end has an inner diameter designed to receive a lead wire in electrical contact therewith.

Description of the preferred embodiment

Turning now to the appended drawing in detail, a probe assembly embodying the present invention is illustrated in operative assembly with a housing section 11 having a hole or aperture 13 therein seating the body member generally designated by the numeral 10. As best seen in FIGURE 2, the body member 10 has an elongated cavity 12 therein extending throughout most of its length and opening at one end thereof, and it also has a channel 14 which provides communication between the other end of the cavity 12 and the other or front end thereof.

Seated in the channel 14 are a contact probe generally designated by the numeral 16 and an elongated spring generally designated by the numeral 18. The spring 18 has an enlarged central portion 20 which is secured within the cavity 12 of the body member 10 by thermally deforming the one or rear end portion 22 thereof so as to imbed the coils therein, but permitting free movement of the portion of the spring extending therefrom toward the channel 14. In this manner, the spring 18 is locked in position and the deformed portion 22 of the body member 10 provides a fixed surface against which the spring 18 may act. In the illustrated embodiment, the spring 18 tapers to a reduced diameter at both end portions 24, 30 from the larger diameter central portion 20.

The contact probe 16 has a neck portion 26 of cooperating reduced diameter at its inner end so as to provide a radial shoulder 28, and the reduced end portion 24 of the spring 18 seats thereabout and bears against the radial shoulder so as to bias the contact probe 16 outwardly of the channel 14. Although frictional engagement may be relied upon to retain the spring 18 in assembly with the neck portion 26 of the contact probe 16, preferably the two members are brazed or soldered or otherwise joined together to prevent inadvertent disassembly of the contact probe 16 and its loss. Although the spring 18 may have only a predetermined, limited amount of expansion to determine the extent of protrusion of the contact probe 16 from the end of the body member 10, it can be seen that an effective stop is provided by the shoulder surface formed in the cavity 12 about the channel 14 so long as the outer diameter of the end portion 24 is sufficiently larger than the channel 14.

As illustrated in the drawing, contact with an insulated lead 34 shown in phantom line may be simply and readily attained by having the end portion 30 of the spring 18 taper to an inside diameter which is cooperatively dimensioned to receive the wire 32 of the lead 34. If so desired, the two may be permanently joined together by soldering, brazing or the like. In this particular embodiment, the body member 10 is provided with an enlarged portion or collar 36 adjacent the contact probe or front end to provide a radial shoulder thereabout. In this manner, the probe assembly can be locked in place within the hole 13 of the housing section 11 against the tendency of the spring 18 to bias the probe assembly outwardly thereof.

Thus it can be seen that the spring 18 will normally urge the contact probe 16 outwardly to the channel 14 to make contact with the conductive surface by reason of its action between the deformed end portion 22 of the body member 10 imbedding its coils and the neck portion 26 of the contact probe 16. However, the probe 16 may be pressed inwardly of the body member 10 against the action of the spring 18 by any significant change in surface contour reducing the spacing between the end of the body member and the contact surface.

From the foregoing description, the operation of the present probe assemblies is believed to be quite apparent. The assembly is mounted adjacent a cooperating conductive member 40 fragmentarily and schematically illustrated in FIGURES 2 and 3, such as in a rotary switch, with the probe 16 being urged outwardly of the body member 10 by the action of the spring 18. In FIGURE 2, the fully extended probe 16 does not make contact with the depression 41 in the conductive member 40. In FIGURE 3, the compressibility of the spring 18 permits the probe 16 to be forced inwardly into the body member 10 when it is in contact with the raised portion 42 of the conductive member 40.

Thus, the probe assembly can also readily accommodate surface variations such as the protrusions and depressions of a wiped member or the ridges or lumps which are sometimes utilized as physical dielectric barriers between adjacent areas of electrical conductivity on the cooperating surface. Movement of the cooperating surface relative to the probe assembly brings the probe into contact with successive points of conductivity thereon, which points will normally be connected to different elements to which, or from which, transfer of electrical power is desired. The probe assemblies may, of course, be furnished as such to users for manual use or they can be incorporated into assemblies, such as with the various types of cooperating conductive surfaces herein suggested.

It will be appreciated that various modifications of the illustrated embodiment may be employed. Although the body member has been illustrated as having a circular cross section since a very convenient method of installation in assembly with a housing section is through a drilled hole, other external configurations may be equally suitable for other structures. Other means for holding the probe assembly in the hole of the housing section may also be employed such as separate pins, staking or thermal deformation etc. The length of the body member and the relative lengths of the cavity and channel are not important. In fact, the channel may be a continuation of the cavity and of the same diameter so that a common bore extends throughout the body member. In such a structure, it is desirable to provide some separate means serving as a stop surface for the end of the spring to limit the amount of projection of the contact probe outwardly of the body member.

The spring which is illustrated in the drawing constitutes an embodiment of the invention which may be readily assembled with the body, contact probe and lead wire while also providing the compressibility necessary for positive contact and movement of the probe relative to the body. The component parts can be readily assembled by first securing the spring and contact probe by any convenient means such as solder, slipping these components into the body and then locking the spring in the body such as by heat deformation of the rear end thereof. To mount the assembly in an electrical device, the body is simply affixed in the housing and a lead wire inserted into the protruding spring end and fastened thereto by solder or other suitable means.

The spring configuration may be varied considerably and yet provide the advantages of the invention. In fact, to ensure that the force of the probe will have a calculable and consistent value, it is most desirable that an abrupt reduction, rather than a taper, should occur in the spring forward of the enlarged central position, so that the portion of the spring urging the contact probe outwardly has a substantially uniform reduced diameter. Alternatively, the spring may be uniform throughout its entire length with the body member having a section of reduced cross-section in the cavity at a point remote from the front end thereof so that the spring is securely retained within the body member and a surface is provided against which the spring may act. Similarly, the rear end of the spring may have other configurations which are equally suitable for receiving and securing a lead wire, although the illustrated form greatly facilitates attachment of a lead wire due to the accessibility and flexibility of the spring portion. Most desirably, the spring is preloaded, i.e., under compression in its normal position in the cavity, to eliminate "play" in the probe when there is no inward force upon it.

In the illustrated embodiment, the spring is secured to the body by deforming the rear end of the body member under heat and pressure to cause the material thereof to flow about the central portion of the spring. In this manner the spring is partially imbedded in the material as in the structure shown, although that portion may be wholly encapsulated within the material of the body member by sufficient flow thereof. However, techniques other than heat deformation may be employed; for example, the cavity of the body member may be threaded and the spring secured to the body member by screwing it thereinto, a pin may be secured therethrough, a cap may be secured over the rear end of the cavity or the material of the body member may be staked intermediate its length. In a preferred form, the rear end of the body is rolled or otherwise deformed to lock the spring in the cavity, and this structure may be used in combination with deformation of a portion of the body length, providing the desired engagement and surface for the spring to act against. In addition a resin may be flowed into the end of the cavity to seal it.

As regards the point on the body member at which the spring is engaged, it is normally adjacent the rear end of the body to permit optimum utilization of the length of the spring within the cavity. Moreover, the spring may be completely received within the cavity of the body member to provide a more thoroughly insulated assembly, although decreasing the facility with which the lead wire may be affixed to the spring.

Although the contact probe may have a neck portion of reduced diameter, as illustrated, economy of manufacture may dictate the use of a uniform diameter. Frictional engagement, achieved through close dimensioning of the parts, may be relied upon exclusively for joining the spring and probe, albeit with lesser security against inadvertent disassembly; however, positive electrical engagement is desirably provided by soldering or brazing, and other mechanical features can be utilized including staking, pins and the like.

Although the method of joining the lead wire to the opposite end of the spring may be purely frictional through close dimensioning or the two may be crimped into locked relationship, the lead wire is preferably soldered, brazed or welded to the spring because such metallurgical bonding techniques are the best way of ensuring structural strength combined with excellent electrical contact.

The body member of the contact probe assemblies of the present invention is normally fabricated from an insulating material, or an insulating insert may be employed in a conductive shell, or vice versa, albeit with an increase in parts. Various non-conducting materials, such as natural or synthetic rubber, thermoplastic and thermosetting resins, glass, porcelain or the like, are suitable. If a resin is employed, there are significant advantages to using a thermoplastic material not only from the standpoint of initially fabricating the body but also from the standpoint of joining the body member and the spring since this resin may be heat deformed. As has been suggested previously, the spring and the body member may be joined by other methods such as by providing a threaded portion in the cavity or with an adhesive, which techniques may be most suitable when the body material is glass, a thermosetting resin, etc. It should be appreciated that the body is not necessarily insulating, and in some instances use of a conductive material may be desirable.

The method of forming the body member will depend upon the particular material employed, and will be apparent to those who are skilled in the art. The cavity and channel in the body may also be formed in numerous ways, such as by molding them initially when the body is formed or by boring the body subsequent to the forming operation. Although in the illustrated embodiment the shoulder surface formed in the cavity about the channel is bevelled, in some cases a flat surface may be more desirable or economical.

As regards the materials used for the probe and the spring, these must be electrically conducting, and any of the common conductive metals may be used. However, noble metal alloys such as those of platinum and gold are highly desirable for the probe because of their corrosion resistance and low contact noise, and gold plating may desirably be applied to the spring.

Accordingly, it can be seen that the present invention provides a novel probe assembly by which positive electrical contact can be made with moving elements and which can be used in numerous make-and-break applications. The probe assembly is of simple design and construction and requires only three quite elementary component parts. As installed, the only electrical connections necessary are those between the spring and probe and the spring and lead wire. Thus the present devices are reliable, efficient and durable and are readily assembled with a minimum expenditure for parts and handling costs.

Having thus described the invention, I claim:

1. A probe assembly comprised of a body member having an elongated cavity therein and a channel extending from said cavity to the exterior of one end thereof; an elongated contact probe in said cavity and extending outwardly of said body member through said channel, said channel and cavity of said body member and said probe being cooperatively dimensioned and configured for sliding movement of said probe therein; an electrically conducting elongated compression spring seated in said cavity and having one end engaged with and in electrical contact with said probe, and having means on the other end engageable with a conductive lead element, said body member having fixing means spaced from said one end of said spring limiting movement of said spring relative to said one end of said body member and providing a fixed surface against which said spring may act to bias said probe outwardly of said channel, and said spring being compressible to allow sliding movement of said probe inwardly of said channel.

2. The probe assembly of claim 1 wherein the exterior configuration of said body member, said cavity and said channel are of coaxial, circular cross section, and the diameter of said channel is less than the diameter of said cavity.

3. The probe assembly of claim 1 wherein said spring has a central portion and end portions of reduced diameters relative thereto, with said one end portion thereof encircling a portion of said probe and the other end portion having an inner diameter dimensioned to receive a lead wire, said probe portion being metallurgically bonded to said one end portion.

4. The probe assembly of claim 3 wherein said body member is of a thermoplastic resin and wherein said spring central portion is imbedded therein to provide said means limiting movement of said spring and said fixed surface.

5. The probe assembly of claim 3 wherein said spring has an abrupt reduction in diameter from that of said central portion toward said probe.

6. The probe assembly of claim 1 wherein the other end of said spring extends outwardly of the other end of said body member to facilitate attachment of a lead wire thereto.

7. The probe assembly of claim 1 wherein said contact probe has a neck portion of reduced diameter at its inner end providing a radial shoulder, and wherein said end portions taper to reduced diameters with said one end seating about said neck, bearing against said shoulder, and being bonded to said inner end of said probe.

8. The probe assembly of claim 1 wherein the outer surface of said body member has an enlarged portion adjacent said one end to provide a shoulder for engagement with a fixed surface to limit movement away from a surface in contact with said one end of said probe.

9. The probe assembly of claim 1 wherein said probe is fabricated of a metallic composition selected from the group consisting of noble metals and noble metal alloys.

10. The probe assembly of claim 1 wherein the exterior configuration of said body member, said cavity and said channel are of coaxial, circular cross section, the diameter of said channel being less than the diameter of said cavity and wherein said spring has a central portion and end portions of reduced diameters relative thereto, with said one end portion thereof encircling said probe and the other end portion extending outwardly of the other end of said body member and having an inner diameter dimensioned to receive a lead wire, said probe portion being metallurgically bonded to said one end portion.

11. The probe assembly of claim 10 wherein said body member is of a thermoplastic resin and wherein said spring central portion is imbedded therein to provide said means limiting movement of said spring and said fixed surface.

References Cited

UNITED STATES PATENTS

| | | | |
|---|---|---|---|
| 1,223,222 | 4/1917 | Tomlinson | 200—51 |
| 1,584,167 | 5/1926 | Camfield | 339—255 X |
| 2,393,083 | 1/1946 | Wisegarver | 339—256 X |
| 2,458,552 | 1/1949 | Blattner | 29—155.55 |
| 2,606,278 | 8/1952 | Smith | 339—55 |
| 2,902,629 | 9/1959 | Little et al. | 339—256 X |

FOREIGN PATENTS 663,579  5/1963  Canada.

RICHARD E. MOORE, *Primary Examiner.*

U.S. Cl. X.R.

339—126, 218, 255